(12) United States Patent
Hoffstadt et al.

(10) Patent No.: US 10,040,277 B2
(45) Date of Patent: Aug. 7, 2018

(54) SELF-LEARNING TEST CHART OPTIMIZING SYSTEM

(71) Applicant: GMG GmbH & Co. KG, Tübingen (DE)

(72) Inventors: Hanno Hoffstadt, Ulm (DE); Zoran Subotin, Kusterdingen (DE)

(73) Assignee: GMG GMBH & CO. KG, Tübingen (DE)

( * ) Notice: Subject to any disclaimer, the term of this patent is extended or adjusted under 35 U.S.C. 154(b) by 0 days.

(21) Appl. No.: 15/334,447

(22) Filed: Oct. 26, 2016

(65) Prior Publication Data
US 2017/0113454 A1 Apr. 27, 2017

(30) Foreign Application Priority Data

Oct. 26, 2015 (EP) .................................. 15191512

(51) Int. Cl.
*B41F 33/00* (2006.01)
*B41F 5/24* (2006.01)
*H04N 1/60* (2006.01)

(52) U.S. Cl.
CPC ................ *B41F 33/00* (2013.01); *B41F 5/24* (2013.01); *H04N 1/6033* (2013.01)

(58) Field of Classification Search
CPC .......... B41F 5/24; B41F 33/00; H04N 1/6033
See application file for complete search history.

(56) References Cited

U.S. PATENT DOCUMENTS

| | | | |
|---|---|---|---|
| 6,441,923 B1 | 8/2002 | Balasubramanian et al. | |
| 2005/0093879 A1 | 5/2005 | Zanghi et al. | |
| 2006/0152776 A1 | 7/2006 | Bailey | |
| 2011/0235141 A1* | 9/2011 | Shestak | H04N 1/6033 358/504 |
| 2011/0279833 A1* | 11/2011 | Hoshii | H04N 1/6038 358/1.9 |
| 2012/0300228 A1 | 11/2012 | Brothers | |
| 2017/0054878 A1* | 2/2017 | Takemura | H04N 1/6041 |
| 2017/0094125 A1* | 3/2017 | Yamamoto | H04N 1/6027 |

* cited by examiner

*Primary Examiner* — David Banh
(74) *Attorney, Agent, or Firm* — Harness, Dickey & Pierce, P.L.C.

(57) ABSTRACT

In order to improve a method for optimization in the creation of test charts with the aim of improving the quality of prioritization, the invention proposes a method for optimizing a plurality of test patch-comprising test charts for printing purposes, wherein a prioritization of the test patches is carried out on the basis of the specification of the target printing method, the intended number of colors as well as the color identification and the intended mixing intentions, and a compilation of test patches is made according to that prioritization, wherein the test chart is printed, the printed test chart is colorimetrically measured, and the result is used for optimizing the prioritization.

7 Claims, 5 Drawing Sheets

Printing Prozess  Flexo

Figure 1:

Select Inks:  6
Max Number of Inks in Overprints:  4
Total Area Coverage:  400

Inks

| Name | Usage | Screening Type |
|---|---|---|
| Cyan | Separation (CMY) | Grid 1 |
| Magenta | Separation (CMY) | Grid 2 |
| Yellow | Separation (CMY) | Grid 3 |
| Black | Contrast (Black) | Grid 4 |
| Orange | Spot Color | Grid 1 |
| Green | Solid Only | |

Finalize  1 Page / 972 Patches

Page Size  Patches
295 mm x 200 mm  972 Patches - 27 x 36

Fig. 3

Select Inks: 7

Max Number of Inks in Overprints: 4

Total Area Coverage: 400

Inks

| Name | Usage | Screening Type |
|---|---|---|
| Cyan | Separation (CMY) | Grid 1 |
| Magenta | Separation (CMY) | Grid 2 |
| Yellow | Separation (CMY) | Grid 3 |
| Black | Contrast (Black) | Grid 4 |
| MyRed | Spot Color | Grid 1 |
| MyGreen | Spot Color | Grid 2 |
| MyBlue | Spot Color | Grid 3 |

Finalize    2 Pages / 564 Patches

| Page Size | Patches |
|---|---|
| 250 mm x 100 mm | 360 Patches - 12 x 30 |
| 150 mm x 100 mm | 204 Patches - 12 x 17 |

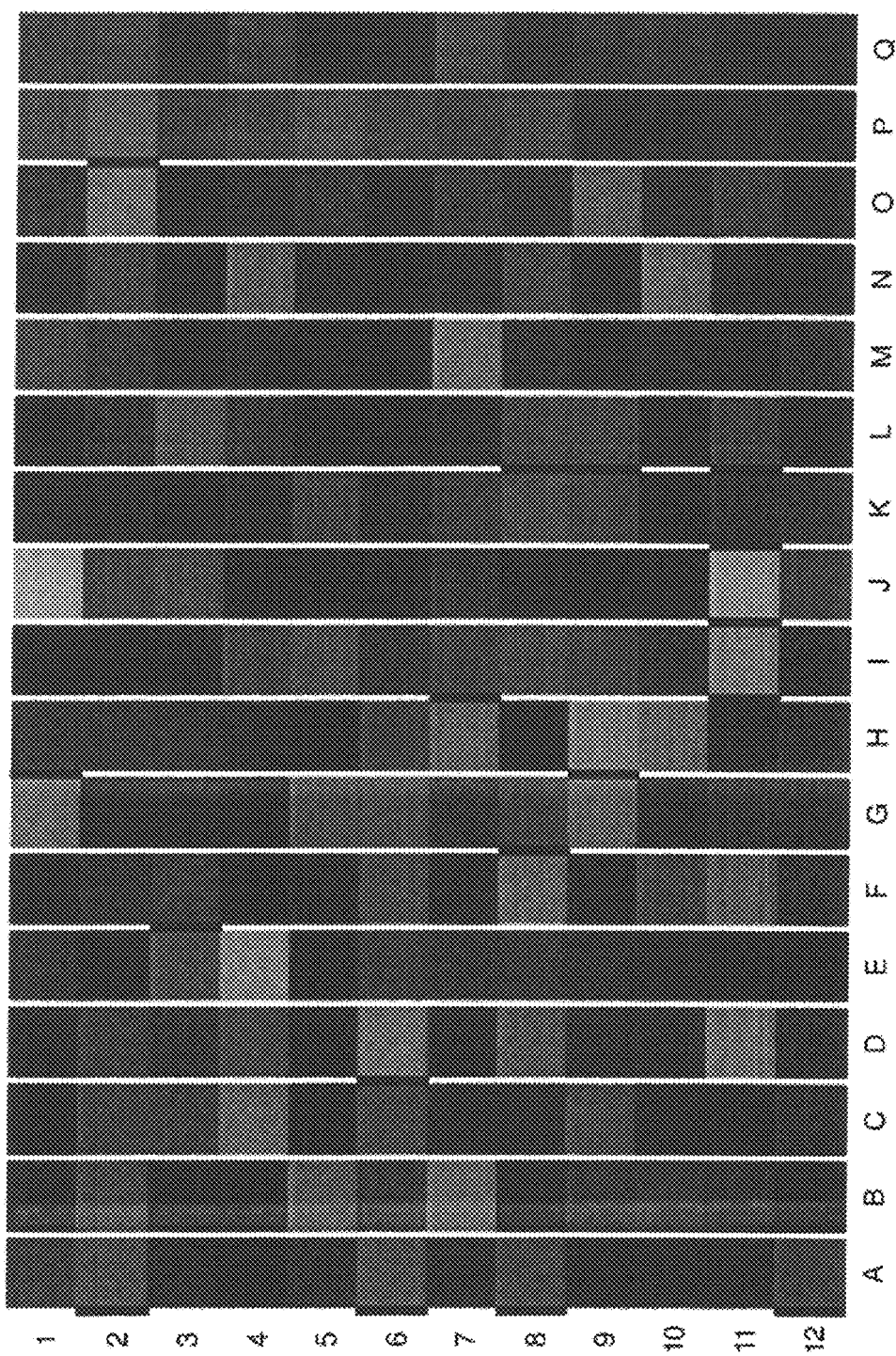

SELF-LEARNING TEST CHART OPTIMIZING SYSTEM

The present invention relates to a method for optimizing a plurality of test patch-comprising test charts for printing processes. In particular, the invention serves to provide a method for optimizing prioritization procedures.

It is known in connection with printing processes to print so-called test charts. These are fields with a mainly predefined geometry imprinted with different colors. Printing processes are generally based on printing every color of the colors available for printing in a percentage proportion of 0-100% per printing dot. The final result is a particular color appearance at the respective printing dot. To check the quality of and especially metrologically reconstruct the respective definite print result, the usual procedure is to print the fields, the so-called patches, constituting the test chart according to specific rules. Accordingly, a test patch is first printed in a predefined percentage grid for every color that is available and intended to be used.

Assuming that four colors are intended for the present print, a respective test patch is printed with the percentage share of a color in a grid of 10%, for example. Accordingly, four rows of ten test patches per row, i.e. for every color of 0-100% in a grid of ten, are produced. Furthermore, it is now possible to produce patches where the percentage share of all the colors is varied. If four colors are used, these will usually produce about 2000 patches for percentage grids of the respective individual color and the respective mixing possibilities. Meanwhile, a number of seven colors already produce 10,000 to 20,000 patches, for example.

In the first instance, the production of test charts means a high economic expenditure. There must be provided the respective space for the intended test chart on the different print products, and it is obvious that the production of a test chart consumes a considerable amount of ink. Depending on the printing method and on the size of the test chart, complete printed sheets are almost exclusively used for making test charts, which additionally significantly increases the economic expenditure. If necessary, printing facilities are entirely used just for making test charts, and it may be necessary for the print products being adapted to the requirements of test chart production.

By measurement of the individual test patches in random checks it can be verified whether the quality of the print product meets the requirements.

It is known that the quality problems may be different in the different printing methods. In the so-called flexo printing, it usually is the so-called highlight region that causes problems, i.e. the light color region.

Recently, a method for creating test patches has been proposed with the aim of reducing the technical and financial expenditure for the production of test charts.

According to the proposal, a number of specifications and input parameters are used for carrying out a prioritization of test patches. These specifications and input parameters are the identification of the target printing method, the intended number of colors, the color identification, and the planned mixing intentions. Prioritization of the test patches means that the individual test patches are arranged in the order of importance, taking account of the specifications. Thereafter, a compilation of test patches is produced according to this prioritization, and the test patches can be printed as a test chart. In this way, it is possible not to print or entirely avoid already known or unimportant test patches or to print them only if there is sufficient time, space and/or economic resources.

For the compilation of test patches, the above-described proposal takes into account a specification of the predefined space for a test chart. This means that an area can be provided on the print products that can be a one-part or multi-part area, depending on the printing project, so that the areas into which test charts can be printed are fixed in advance. Depending on the resulting available space, the order of the test patches can be processed based on the prioritization, and a test chart comprising the most important patches for the current printing job can be created.

The generic method serves the purpose of optimization in the production of test charts. The economic expenditure of printing processes is thus significantly reduced. Further, the test charts can be optimized with regard to the sorting of the test charts, which simplifies and improves also the measuring operations.

However, in the generic method, said prioritizations are based on model assumptions.

Based on the above prior art, it is an object of the present invention to improve a method for optimization in the creation of test charts with the aim of improving the quality of prioritization.

For the technical solution of this object the invention proposes a method comprising the features of patent claim 1. Further advantages and features of the invention are stated in the subclaims.

According to the invention, the test chart is printed and the printed test chart is colorimetrically measured. The result is now used for optimizing the prioritization. The result can be stored for this purpose. It is possible to perform a complete reprioritization on the basis of the measurement results. For example, the measurement can produce test patches that deviate extremely slightly from the model assumptions for the prioritized test patches. These do not require any future prioritization. It is also possible to prove that certain color areas and hence test patch areas usually hardly reveal any differences between model assumptions for prioritization and the measured print result.

Such differences may be neglected or used for optimization in future prioritization processes. For example, the number of test patches can be reduced or, alternatively, a better quality can be achieved for the same area when using a different prioritization of the test patches. Finally, the entire prioritization model can be optimized and tailored.

A further advantage of the invention will be achieved if the measurement results are stored in a database which can be interrogated. In this manner, the system cannot only be used locally, i.e. in relation to a job, a production line or the like, but also globally via the use of media like the Internet and the like. In particular, matching and reprioritization can also take place automatically, for example by checking predetermined deviation tolerances.

Figure 2:
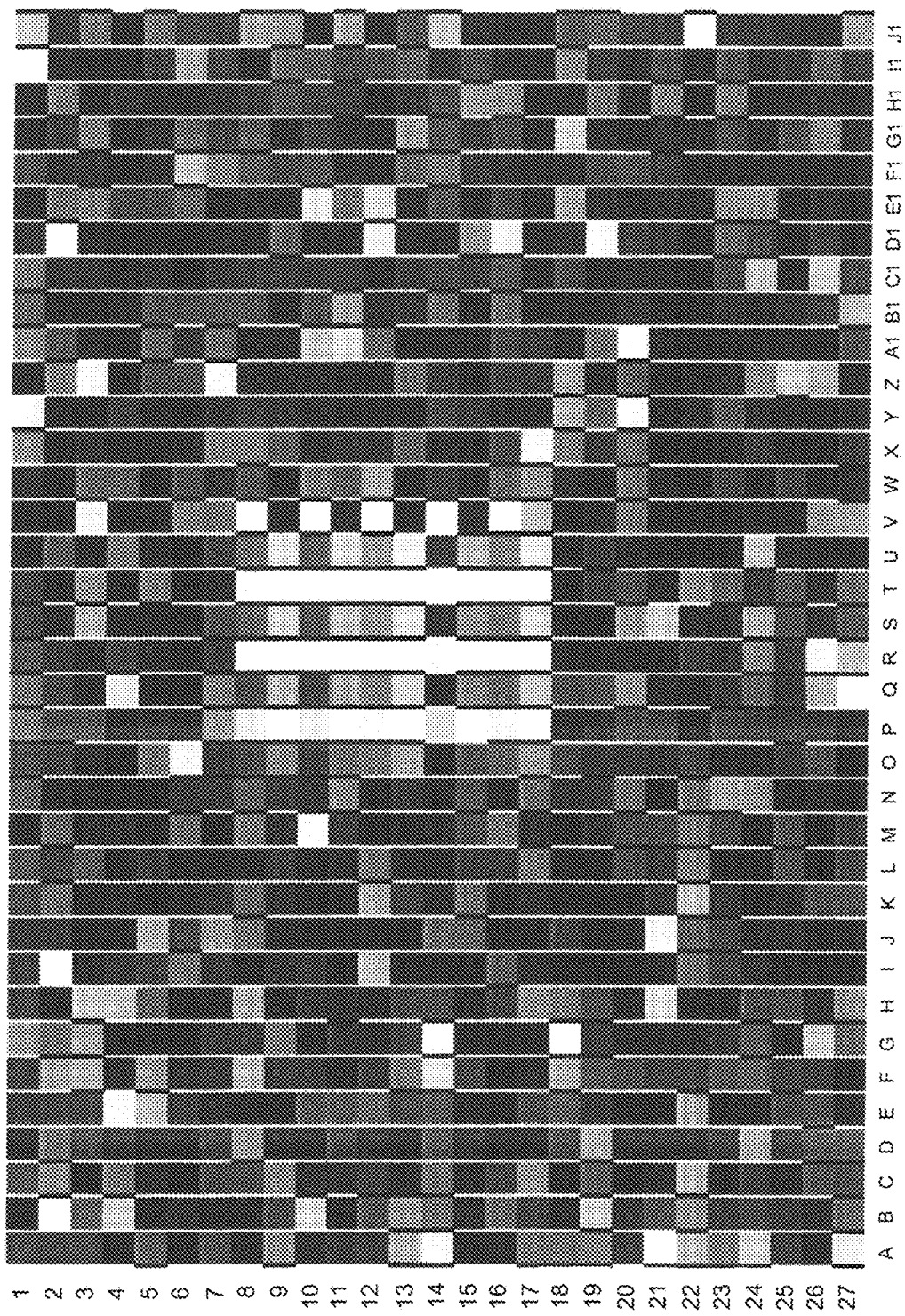
Figure 4:
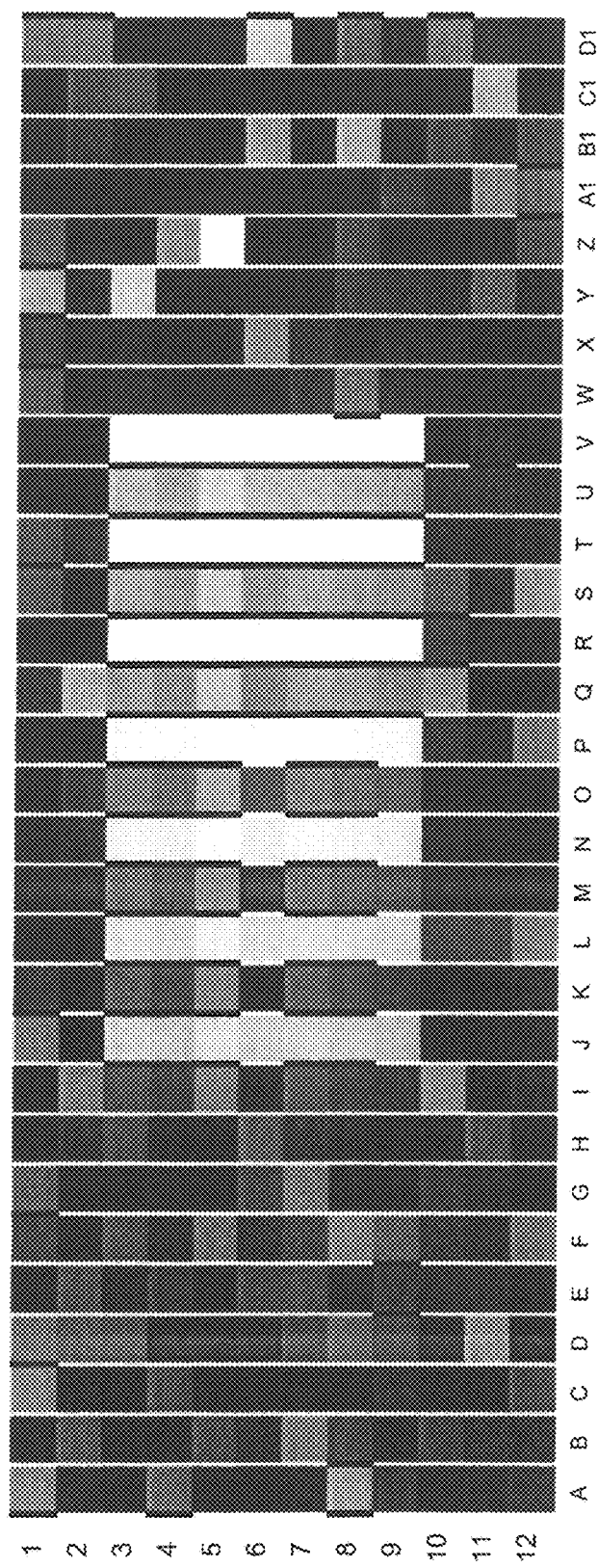

With the present invention there is proposed a method for optimizing test charts that can be easily implemented, significantly reduces the economic expenditure of printing operations, and clearly improves the results. Further advantages and features of the invention will become apparent from the following description with reference to the attached drawings in which it is shown by:

FIG. 1 an exemplary representation of a data collection screen for compiling the specifications;

FIG. 2 a test chart optimized taking into account the specifications according to FIG. 1;

FIG. 3 an alternative exemplary representation of a data collection screen for compiling the specifications;

FIG. 4 a first test chart optimized taking into account the specifications according to FIG. 3;

FIG. 5 a second test chart optimized taking into account the specifications according to FIG. 3.

According to FIG. 1, data for compiling the specifications for an intended print are compiled. First of all, it was determined under the aspect "printing process" that a so-called flexo printing process shall be performed. Then it was determined that six inks shall be used, all of them in overprints. Two inks (Cyan and Orange) used the same grid configuration and could not be overprinted for that reason; one ink (Green) is only present as a solid. Further, it was determined which purpose each of the inks should serve. Accordingly, inks were identified as separation inks, as a single ink and the like. Finally, a field of 295×200 mm was fixed as a field for a test chart.

Based on the specification of space, it was calculated that 972 patches are printable which are placed in 27 rows with 36 columns each. Thus the test chart according to FIG. 2 was printed. It can be seen already, that a significantly reduced number of patches was produced compared to conventional six-color processes. This comprises the critical color combination and single color areas in order to achieve in this manner optimal measurement results at a reduced expenditure.

According to FIG. 3 it was determined that seven inks shall be used, four of them in overprint. Here, too, the corresponding properties were fixed. Two areas with different dimensions were defined as the space. Hence a division was made by means of the prioritization. Thus the two patch fields shown in the FIGS. 4 and 5 are produced which together produce the optimal test chart for the present process.

The described embodiments merely serve to more clearly explain the present invention and are not in any way intended to be limiting. Various additional features may be used without departing from the scope of the present invention.

The invention claimed is:

1. A method of printing an optimized test chart including test patches comprising:
    specifying a target printing method;
    specifying an intended number of colors;
    specifying a color identification;
    specifying color mixing intentions;
    determining a prioritization of the test patches in an order of importance based on the target printing method, the intended number of colors, the color identification and the color mixing intentions;
    producing a compilation of the test patches according to the prioritization;
    printing a test chart;
    colorimetrically measuring the printed test chart to obtain a measurement result; and
    optimizing the prioritization based on the measurement result to define the optimized test chart.

2. The method according to claim 1, wherein the measurement result is stored.

3. The method according to claim 1, wherein the measurement result is used for a reprioritization.

4. The method according to claim 3, further comprising cancelling a prioritized test patch from the prioritization based on determining a minor deviation between the prioritized test patch and a measured test patch.

5. A method according to claim 1, further comprising optimizing the method by reducing a number of test patches.

6. A method according to claim 1, further comprising optimizing the method by modifying the prioritization.

7. A method according to claim 1, wherein the measurement result is stored in a database which can be interrogated.

* * * * *